United States Patent
Tillotson et al.

(10) Patent No.: US 7,592,955 B2
(45) Date of Patent: Sep. 22, 2009

(54) AIRBORNE TURBULENCE LOCATION SYSTEM AND METHODS

(75) Inventors: Brian J. Tillotson, Kent, WA (US); Marissa Singleton, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/555,176

(22) Filed: Oct. 31, 2006

(65) Prior Publication Data

US 2009/0009393 A1  Jan. 8, 2009

(51) Int. Cl.
*G01S 3/16* (2006.01)
*H04B 7/185* (2006.01)

(52) U.S. Cl. .................... 342/378; 342/352
(58) Field of Classification Search ........... 342/357.02, 342/357.06, 378, 352; 701/3, 10, 213
See application file for complete search history.

(56) References Cited

U.S. PATENT DOCUMENTS

| | | | |
|---|---|---|---|
| 7,092,846 B2 * | 8/2006 | Vock et al. | 702/182 |
| 2004/0008850 A1 * | 1/2004 | Gustavsson | 381/92 |
| 2006/0121893 A1 * | 6/2006 | Tillotson et al. | 455/431 |

FOREIGN PATENT DOCUMENTS

WO PCT/US2007/082276 A   10/2007

* cited by examiner

*Primary Examiner*—Dao L Phan
(74) *Attorney, Agent, or Firm*—Tung & Associates

(57) ABSTRACT

A system and methods for calculating a range to a turbulent air region from an antenna platform is disclosed. The methods determine a correlation lag value corresponding to a time shift in receiving propagation of an interference pattern traveling along a path that is subject to the turbulent air region at antennas responsive to incident electromagnetic energy. Based upon the correlation lag value, the methods calculate the range to the turbulent air region from the antenna platform and issue a warning that indicate the range.

27 Claims, 4 Drawing Sheets

AIRBORNE TURBULENCE LOCATION SYSTEM AND METHODS

TECHNICAL FIELD

The present invention generally relates to aircraft safety measures, and more particularly relates to systems for measuring the location of turbulence.

BACKGROUND

Clear air turbulence (CAT) occurs at typical jet cruise altitudes, due to a number of different factors, including: the location of the jet stream, the location of the tropopause boundary, the location of localized severe weather including thunderstorms, and the location of mountainous terrain. However, all clear air turbulence phenomena have one thing in common: the phenomena occur in clear air, and aircraft currently have very few ways to avoid these phenomena except to maneuver or change flight altitudes once they have entered the turbulent region.

Turbulence (especially CAT), is a serious concern for air travel. Some airlines take strong measures to avoid regions of forecast or previously discovered turbulence, sometimes flying many extra miles to avoid turbulence. In many areas of the country, the number of options available to an airline to reroute a flight are limited due to airspace capacity or air traffic control system constraints. There are many efforts to improve the identification of turbulent air, however, these efforts only help after one or more flights has flown into rough air, and they don't provide a way to constantly scan the airspace. Currently, there is no affordable, reliable way for an airplane to detect CAT in time to take evasive action.

The problem with CAT is that it occurs in clear air in the absence of particulate matter, such as clouds. Many existing methods of detecting turbulence are dependent upon the existence of particulate matter (moisture, dust, etc.) in the air, which does not help with the detection of CAT in the cruise altitudes at which aircraft (commercial, military, or unmanned air vehicles (UAVs)) can fly. For example, in the high clean air where airliners fly, CAT is often undetectable to Doppler radar or lidar systems that rely on particles in the air.

Previous work has demonstrated that it is technically feasible to detect CAT using scintillation of GPS signals. However, these previous methods were not able to solve the problem of accurately locating the turbulent air with respect to range from the GPS receiver. Prior methods could only determine the existence of turbulence somewhere along the signal's path (along the line of sight to the satellite). Other evaluated methods are too expensive or heavy to be practical for installation aboard an aircraft.

Thus, it is desirable to have a cost effective system and methods for detecting CAT to increase air traffic system capacity by more precisely pinpointing the range and altitude of turbulence before the aircraft penetrates the turbulent air region. It is further desirable for the system and methods to allow air traffic systems and operators to more precisely plan for avoiding these turbulent air regions.

Other desirable features and characteristics of embodiments of the present invention will become apparent from the subsequent detailed description and the appended claims, taken in conjunction with the accompanying drawings and the foregoing technical field and background.

BRIEF SUMMARY

A system and methods for calculating a range from an antenna platform to air turbulence are disclosed. The methods determine a correlation lag value corresponding to a time shift in the propagation of an interference pattern from a first antenna to a second antenna that is separated by a distance from the first antenna. Based upon the correlation lag value and antenna separation, the methods calculate the range from the antenna platform to the air turbulence and issue a warning that indicate the range.

The methods determine the correlation lag value by sampling a first series of interference pattern amplitudes/phases at the first antenna to obtain a first amplitude/phase pattern, and sampling a second series of the interference pattern amplitudes/phases at the second antenna to obtain a second amplitude/phase pattern. The methods then compute temporal correlation coefficients between the first and second series of interference pattern amplitudes/phases at a sequence of time lags to determine how well the amplitude/phases patterns match at each time lag. The methods select a time lag corresponding to a highest value of the computed temporal correlation coefficients where the amplitude/phase patterns are most closely matched. The value of time lag with the highest correlation is the correlation lag value.

The correlation lag value and antenna separation from the first antenna to the second antenna are used to calculate the range to a turbulent air region. A warning may be issued indicating the range to the turbulent air region.

Various example embodiments of the invention described herein calculate the range of a turbulent air region to accommodate for the following scenarios: whether the antenna platform is stationary or mobile and/or the turbulent air region is stationary or mobile; whether the antenna platform is in a line of sight of the satellite; or whether the antennas are separated horizontally and/or vertically.

The techniques described herein can increase air traffic system capacity by more precisely pinpointing the location (range and altitude) of the turbulent air region, providing a means for the air traffic system providers and the operators to more precisely plan for avoiding these turbulent air regions.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
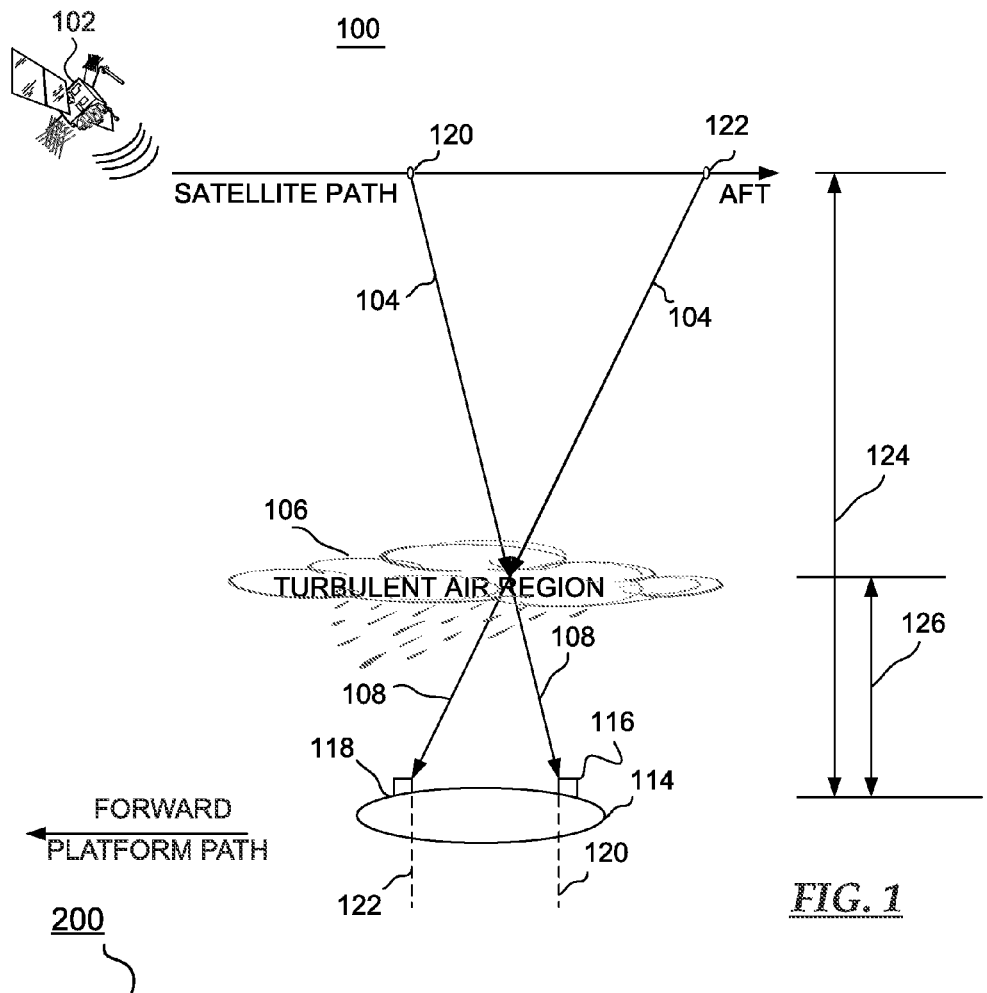
FIG. 1 is a schematic representation of an environment for locating airborne turbulence.

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of communication systems and any number of platforms and that the system described herein is merely one example embodiment of the invention.

For the sake of brevity, conventional techniques related to signal processing, data transmission, signaling, measurements and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the environment illustrated in FIG. 1 and the schematic shown in FIG. 2 depict example arrangements of elements, additional intervening elements, devices, features, or components may be present in an embodiment of the invention (assuming that the functionality of the circuit is not adversely affected).

In most atmospheric turbulence, cells of air, called turbules, rise and fall at different rates due to their differing temperatures. (As an analogy, consider turbules as bubbles of warm air rising in a sea of cold air). A region of turbulent air contains many turbules of various sizes. Each turbule affects electromagnetic waves just as a lens would: it refracts light or RF waves as the waves pass through it. This refraction slightly changes the waves' phase and direction of travel. An electromagnetic signal from a distant source, such as a satellite, acts like a plane wave until the wavefront reaches the turbulent region: all points on the wavefront travel along essentially parallel paths. Within the turbulent region, however, each signal path incurs changes in phase and direction that are different from changes incurred by nearby paths. Thus, the signal that emerges from the turbulent region is no longer a plane wave; rather, each point on the wavefront is traveling in slightly different directions with different phases. As they travel farther, these wave elements create regions of constructive and destructive interference with each other. The spatial pattern of constructive and destructive interference defines locations of strong or weak signal strength, as well as locations of relatively advanced or retarded signal phase. The spatial interference pattern of signal strength and signal phase can be measured by placing a receiver at various locations. The spatial interference pattern changes over time as turbules move within the turbulent region or as the signal source, e.g. a satellite, moves with respect to the turbulent region.

For purposes of explanation, assume that the region of turbulent air is replaced by a single large stationary lens, and that a platform receiving the satellite signal is also not moving. From a point of view of an observer sitting on the platform, watching the satellite travel across the sky, the source of satellite signals from a single satellite would appear to travel laterally because the satellite itself has lateral velocity. When the satellite moves to a location where the lens is between the platform and the satellite, the platform would not see the satellite nor detect its signal unless the satellite, lens, and platform are aligned so that the lens focuses the signal at the platform location. (The focus point corresponds to a peak in the interference pattern described above.) At a later time, when the satellite has moved farther across the sky, the lens would focus the satellite signal at a different location. (This corresponds to a lateral shift in the whole interference pattern.).

Example embodiments of the invention determine a time interval corresponding to a time shift in receiving propagation of the interference pattern from a first antenna at a first location to a second antenna at a second location, and calculate the turbulent air range based on the time interval as described in detail below.

Figure 2:
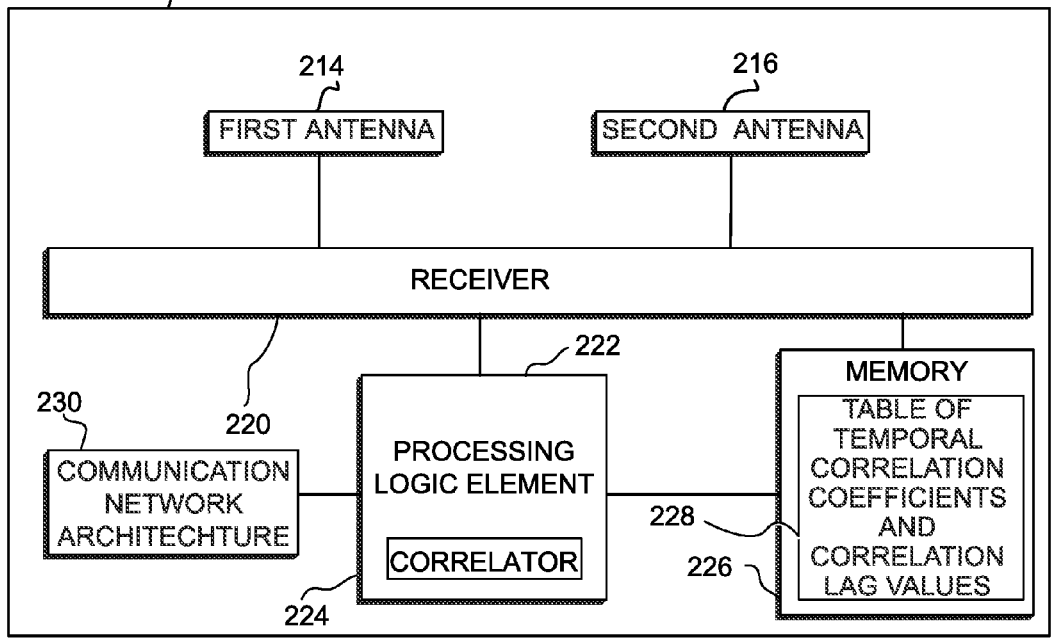
FIG. 2 is a schematic representation of a system configured to locate airborne turbulence.

FIG. 1 is a schematic representation of an environment 100 according to an example embodiment of the invention. Environment 100 uses a plurality of satellite receiving antennas 118/116 (forward/aft), located on a platform 114 (which may be a parked or flying airplane, a floating or moving ship, a stationary or moving ground vehicle, or any suitably configured structure), to receive signals from the satellite 102. In this example, the interference pattern 108 (as explained in the above paragraph), affected by the turbulent air region 106, crosses the aft antenna 116 at a first time value 120 and crosses the forward antenna 118 at a second time value 122. A pseudo ranging algorithm as described below estimates the range 126 of the turbulent air region 106 by analyzing time intervals (time shifts) between the first and the second time values.

FIG. 2 is a schematic representation of system 200 configured in accordance with an example embodiment of the invention. The various blocks depicted in FIG. 2 may be realized in any number of physical components or modules located throughout the platform or the system 200. A practical system 200 may include a number of electrical control units (ECUs), communication systems, onboard computer systems, measurement architectures, networks and components other than those shown in FIG. 2. Conventional subsystems, features, and aspects of system 200 will not be described in detail herein.

System 200 generally includes a plurality of antennas which includes a first antenna 214 and a second antenna 216, a receiver 220, a processing logic element 222 which comprises a correlator module 224, memory module 226 which includes or communicates with a table of temporal correlation coefficients and corresponding correlation lag values 228, and a communication network architecture 230.

The first antenna 214 and the second antenna 216 are coupled to the receiver 220 and are configured to provide data needed for the turbulence computation as described below. The antennas may be separated by some distance $L_0$ along the platform's length or width, and/or separated by a distance $H_0$ along the platform's height. Each antenna is responsive to incident electromagnetic energy to produce a received interference pattern, wherein the electromagnetic energy travels along a path that is subject to the turbulent air region 106.

Example embodiments of the invention call for a minimum of two antennas. However, depending on the platform design, normal maneuvers of the platform may cause the satellite signals to be blocked or to suffer severe multipath fading. In this regard, alternative locations for the antennas may be called for. The platform may include, without limitation, an aircraft, ships, ground vehicles, or ground-based structures. For example, for an aircraft, without limitation, three antennas may be used: One antenna may be located on the vertical stabilizer and/or the wingtips, and two antennas may be located along the fuselage to obtain multiple signal inputs from a specific satellite. Additional antennae may also be added to provide additional data sources to compensate for changes in signal due to aircraft motion (e.g., turning, climbing, or descending). The satellite signal may be, without limitation, a GPS signal, a GPS plus GLONASS and Galileo signal, or a GPS plus iGPS signal.

The receiver 220 is coupled to the antennas and is configured to measure properties of the received interference patterns. The signals received by the antennae are analyzed by an algorithm to compare the relative motion of the platform (e.g., the aircraft) to the relative motion of the satellite. This comparative algorithm takes advantage of the fact that satellites, for example GPS satellites, broadcast a set of codes which contain information on the satellites' position and speed, GPS system time, clock error, and the health and accuracy of the data. This information allows the relative position and motion of the GPS satellite to be predicted with high accuracy.

For example, generally, the GPS receiver onboard the aircraft matches each satellite's coarse acquisition (C/A) code with an identical replica of the code contained in the receiver's database. By shifting the receiver's code to match the satellite signal and by comparing this shift with the satellite internal clock, the receiver is able to estimate its distance to the satellite. However, by using multiple antennas and pseudo ranging algorithms described herein, it is also possible to estimate the range of the turbulent air region 106 by analyzing phase and time shifts of the GPS signals.

In addition, the position and relative motion of the aircraft is measured with high accuracy by onboard flight management computer systems (not shown in FIG. 2). This data along with the satellite distance from the aircraft and the satellite's velocity is then used to compute the range to the turbulent air region 106 using the pseudo ranging algorithm as explained in detail below. The receiver 220, may be, without limitation, a GPS receiver, a GPS plus GLONASS and Galileo receiver, or GPS plus iGPS receiver.

The processing logic element 222 is coupled to the receiver 220 and may include any number of distinct processing modules, correlators, or components that are configured to perform the tasks, processes, and operations described in more detail herein. Although only one processing block is shown in FIG. 2, a practical implementation may utilize any number of distinct physical and/or logical processors, which may be dispersed throughout system 200. In practice, the processing logic element 222 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

The correlator module 224 is coupled to or implemented in the processing logic element 222 and is configured to calculate temporal correlation coefficients $r(\Delta t)$s and the corresponding correlation lags $\Delta t$s, and to select the correlation lag value as explained in more detailed in the context of FIG. 4 below. The correlator module 224 may include, without limitation, parallel processing correlators or serial processing correlators. The correlation lag value is a time interval between signal changes at the forward antenna and signal changes $\Delta t$ later at the aft antenna, and the temporal correlation coefficients are measures of how well the amplitude/phase patterns match at each antenna at each time lag $\Delta t$ as explained in more detail in the context of FIGS. 4-7 below.

The memory module 226 may be any suitable data storage area with suitable amount of memory that is formatted to support the operation of the system 200. Memory module 226 is configured to store, maintain, and provide data as needed to support the functionality of the system 200 in the manner described below. In practical embodiments, memory module 226 may be realized as RAM memory, flash memory, ROM memory, EPROM memory, EEPROM memory, registers, a hard disk, a removable disk, or any other form of storage medium known in the art. The memory module 226 may be coupled to the processing logic element 222 and configured to store, without limitation, measurement data values corresponding to the platform position and velocity, the satellites' positions and velocity, amplitude/phase series of the interference pattern, and a sampling interval. Additionally, memory module 226 may represent a dynamically updating database containing a table of temporal correlation coefficients and the corresponding correlation lags 228 for purpose of computing range to the turbulent air region 106 using the pseudo ranging algorithm as explained in detail below.

The communication network architecture 230 may be coupled to the processing logic element 222 and a measurement architecture (not shown in FIG. 2). The communication network architecture 230 is configured to communicate and to report CAT data. The CAT data is one of many weather information sources that may be integrated to improve both real-time reporting and forecasting of in-flight weather. The CAT data is sent from CAT data service providers to a software application via the communication network architecture 230. The communication network architecture 230 may be, without limitation, a ground communication network or a wireless communication network such as a satellite communication network. A set of middleware, such as a System Wide Information Management (SWIM) system, automatically reads data from many sources via the communication network architecture 230 and reformats the data as needed for use by many different users and applications. SWIM allows integration of atmospheric weather profile information, aircraft state configuration, real-time CAT tracking, and Doppler weather radar. In this regard, system 200 may issue a warning to indicate the turbulent air region 106 range to users of the communication network architecture 230.

The example embodiments of the invention compute the range to the turbulent air region based upon: a measured velocity vector of the platform relative to the velocity vector of the satellite; the distance 124 of the satellite to the platform 114; the speed of the satellite; and the speed/velocity of the interference pattern $V_i$ affected by the turbulent air region 106 as explained in detail below.

Referring to FIG. 1, if the satellite 102 is moving to the right with velocity $V_s$ at a constant distance 124 ($R_s$) from the platform 114, and both the platform 114 and the turbulent air region 106 are stationary, then the distance 126 ($R_t$) from the platform 114 to the turbulent air region 106 is fixed, and the only object moving is the satellite 102. In this regard, the horizontal speed $V_i$ at which the interference pattern 108 appears to travel (assuming that the satellite signal is a straight line in space) is described by the relationship:

$$V_i = -\frac{R_t V_s}{R_s - R_t} \quad (1)$$

The distance $R_t$ to the turbulent air region 106 may be obtained by rearranging the terms of equation (1) above:

$$R_t = -\frac{R_s V_i}{V_s - V_i} \quad (2)$$

As shown in equation (2), the distance $R_t$ between the turbulent air region 106 and the platform 114 is a function of the known range $R_s$ and speed of the satellite $V_s$ (both can be determined from navigation data that the satellite provides) and of the unknown speed $V_i$ of the satellite image cast by the turbulent air region 106. The value of $V_i$ may be determined as a function of the time interval $\Delta t$ between signal changes at the forward antenna and signal changes $\Delta t$ later at the aft antenna as explained in detail in the context of FIG. 3 below. These signal changes may be changes of signal amplitude/phase, signal phase, or both.

Figure 3:
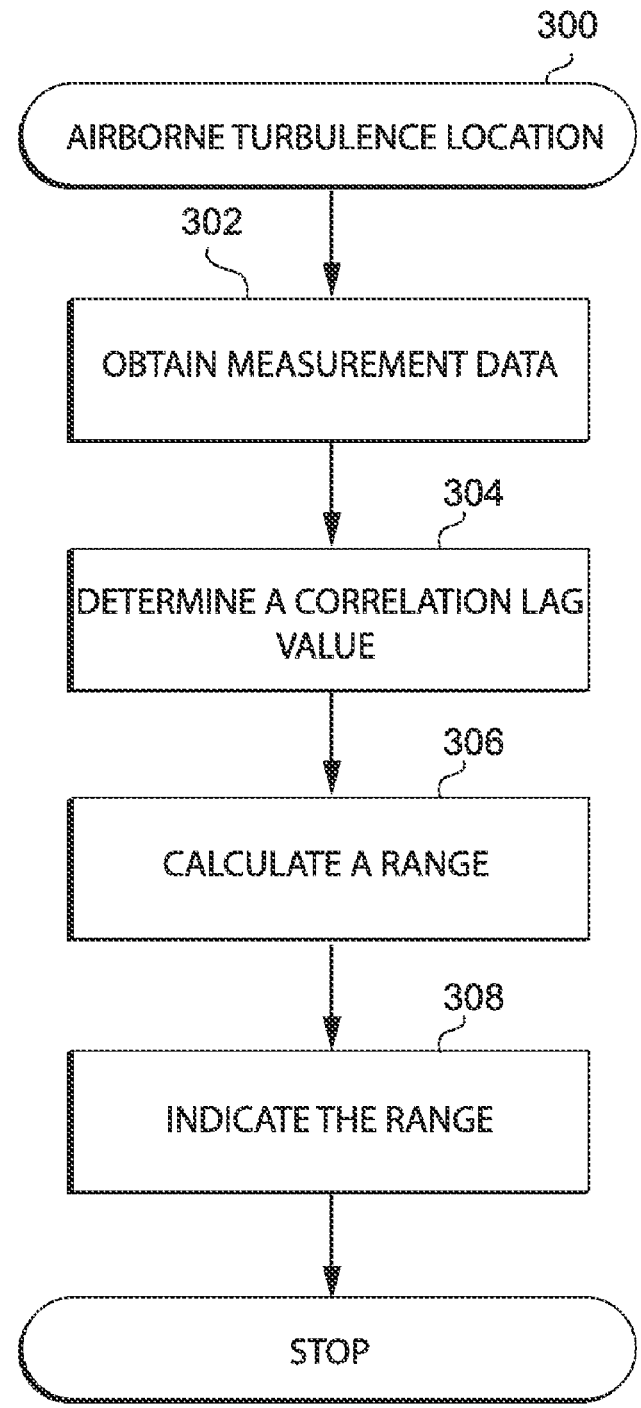
FIG. 3 is a flow chart that illustrates a process for locating airborne turbulence.

FIG. 3 is a flow chart that illustrates an airborne turbulence location process 300 for locating a turbulent air region according to an example embodiment of the invention. The various tasks performed in connection with process 300 may be performed by software, hardware, firmware, or any combination thereof. For illustrative purposes, the following description of process 300 may refer to elements mentioned above in connection with FIG. 1 and FIG. 2. In practical embodiments, portions of process 300 may be performed by different elements of the system 200, e.g., the first antenna 214, the second antenna 216, the receiver 220, the processing logic element 222, the correlator module 224, the memory module 226, and the communication network architecture 230.

Process 300 may begin by obtaining measurement data for calculating the range based upon a correlation lag value (task 302). For example, the measurement data may include, without limitation: a horizontal velocity of the platform, a horizontal velocity of the satellite, a horizontal velocity of the turbulent air region, a horizontal separation of the antennas, a distance of the platform from the satellite, a vertical velocity of the platform, a vertical velocity of the satellite, a vertical velocity of the turbulent air region, and a vertical separation of the antennas.

As explained above, $V_i$, the unknown value of the speed of the interference pattern 108 as described in equation (1), can be determined as a function of the time interval $\Delta t$. Thus, process 300 then determines the time interval $\Delta t$ (correlation lag value) corresponding to a time shift in receiving propagation of the interference pattern at a first antenna and a second antenna (task 304), as described in detail in the context of FIG. 4 below, and proceeds to calculate the range $R_t$ (task 306) based upon the time interval $\Delta t$.

Various example embodiments of the invention described herein calculate the range $R_t$ from the turbulent air region based upon the following scenarios: whether the platform and/or the turbulent air region are stationary and/or mobile; whether the platform is in a near-horizontal line of sight of the satellite; or whether the antennas are separated horizontally or vertically as explained in more detail below.

In one example embodiment, referring to FIG. 1, the aft antenna 116 and the forward antenna 118 are separated horizontally, and both the platform 114 and the turbulent air region 106 are stationary. The antennae may be separated on the platform 114 by the distance $L_0$. In this example, the interference pattern 108 crosses the aft antenna 116 at time $t_1$ (identified by reference number 120), and after a time interval $\Delta t$, the image crosses the forward antenna 118 at time $t_2$ (identified by reference number 122).

The interference pattern speed $V_i$ is calculated from the observed time interval $\Delta t$ between the interference pattern crossing the two antennae. The speed at which the interference pattern is moving is determined based on the relationship:

$$V_i = \frac{L_0}{\Delta t} \quad (3)$$

Substituting $V_i$ from equation (3) into equation (2) above yields a relationship for calculating the range $R_t$ from the turbulent air region as a function of the time interval $\Delta t$.

Thus, according to a first example embodiment, the method calculates the range $R_t$ based on the relationship:

$$R_t = -R_s \left[ \frac{L_0}{V_s \Delta t - L_0} \right] \quad (4)$$

where $R_t$ is the range from the stationary turbulent air region to the stationary platform, $R_s$ is the distance between the stationary platform and the satellite, $L_0$ is the horizontal separation between the first antenna and the second antenna, $\Delta t$ is the horizontal velocity of the satellite, and $\Delta t$ is the correlation lag.

In a second example embodiment, the aft antenna and the forward antenna are separated horizontally and the turbulent air region is stationary as explained above, however, the platform is moving (unlike the first example embodiment above). Therefore, the previous equations need to be adjusted to account for the movement of the platform. In this case, the interference pattern reaches the aft antenna at a time $t_1$. The forward antenna is a distance $L_0$ away at this moment ($t_1$). However, when the interference pattern reaches the original location (the location at $t_1$) of the forward antenna (at time $t_2$), the second forward antenna has moved (not shown in FIG. 1). The image finally catches up to the forward antenna at time $t_3$ (not shown in FIG. 1). The timing in this situation is described by equation (5) below:

$$\Delta t = t_3 - t_1 = \frac{L_0}{V_i - V_a} \quad (5)$$

In equation (5), $V_a$ is the velocity of the platform. So the interference pattern speed is calculated based upon the relationship:

$$V_i = \frac{L_0}{\Delta t + V_a} \quad (6)$$

Substitution of equation (6) to equation (2) yields the range $R_t$ to the turbulent air region 106.

Thus, according to the second example embodiment, the method calculates the range based on the relationship:

$$R_t = -R_s \left\{ \frac{\frac{L_0}{\Delta t} + V_a}{V_s - \left(\frac{L_0}{\Delta t} + V_a\right)} \right\} \quad (7)$$

where $R_t$ is the range from the stationary turbulent air region to the mobile platform, $R_s$, $L_0$, and $\Delta t$ are as explained above, and $V_a$ is the horizontal velocity of the platform.

The first and second example embodiments calculated the range $R_t$ to the turbulent air region based upon a stationary turbulent airmass. However, this may not always be the case since wind may move the turbulent air region.

In a third example embodiment, the aft antenna and the forward antenna are separated horizontally as explained above, but unlike the first and second example embodiments, both the turbulent air region and the platform are moving. The situation is described mathematically in equation (8) below:

$$V_i \frac{(V_t R_s)}{(R_S - R_t)} + \frac{L_0}{\Delta t} + V_a \quad (8)$$

Substituting equation (8) into equation (2) yields the range $R_t$.

Thus, according to the third example embodiment, the method calculates the range $R_t$ based on the relationship:

$$R_t = -R_s \left\{ \frac{V_t + \frac{L_0}{\Delta t} + V_a}{V_s - \frac{L_0}{\Delta t} - V_a} \right\} \quad (9)$$

where $R_t$ is the range from the mobile turbulent air region to the mobile platform, $R_s$, $L_0$, $\Delta t$, and $V_a$ are as explained above, and $V_t$ is the horizontal velocity of the turbulent air region.

Equation (9) gives the range $R_t$ as a function of the time interval $\Delta t$ and wind speed $V_t$. Equation (9) can be used as-is when the winds are well known. This may be the case over well-instrumented regions like North America, Europe, Australia, and areas near Japan. If the winds are known to be roughly uniform along the vector from the platform to the satellite, then the value of $V_t$ may be inserted into equation (9) to get the range $R_t$. In the case where winds vary smoothly along the vector from the platform to the satellite (aside from winds in the turbulence zone), a first-guess value of $R_t$ can be used to pick a location at which $V_t$ can be estimated, using a 3D model. This value of $V_t$ is inserted into equation (9) to estimate a new value of $R_t$. The process repeats until it converges on a single value of $R_t$ and $V_t$.

Horizontal motion of Texas-sized air masses is usually measured in tens of meters per second. Vertical motion of similar air masses is usually measured in centimeters per second. In this regard, in almost all situations, it is safe to assume that a turbulent air region has an effective vertical speed of zero. Therefore, vertically-separated satellite antennas may be used to measure the vertical speed of the interference pattern, with confidence that the vertical speed is almost entirely due to the known satellite motion, the known platform motion, and the unknown range from the platform to the turbulent region.

In a fourth example embodiment, the first antenna and the second antenna are separated vertically in contrast to the first, second, and third example embodiments explained above, and both the platform and the turbulent air region are stationary.

According to the fourth example embodiment, the method calculates the range $R_t$ based on the relationship:

$$R_t = -R_s \frac{H_0}{V_{sz}\Delta t - H_0} \quad (10)$$

where $R_t$ is the range from the stationary turbulent air region 106 to the stationary platform, $R_s$ and $\Delta t$ are as explained above, $H_0$ is the vertical separation between the first antenna and the second antenna, and $V_{sz}$ is vertical velocity of the satellite.

In a fifth example embodiment, the first antenna and the second antenna are separated vertically and the turbulent air region is stationary as explained in the context of the fourth embodiment above, but in contrast to the fourth embodiment, the platform is mobile in this case.

According to the fifth example embodiment, the method calculates the range $R_t$ based on the relationship:

$$R_t = -R_s \left\{ \frac{\frac{H_0}{\Delta t} + V_{az}}{V_{sz} - \left(\frac{H_0}{\Delta t} - V_{az}\right)} \right\} \quad (11)$$

where $R_t$ is the range from the stationary turbulent air region to the mobile platform, $R_s$, $H_0$, $\Delta t$, and $V_{sz}$ are as explained above, and $V_{az}$ is vertical velocity of the platform.

In a sixth example embodiment, the first antenna and the second antenna are separated vertically and the platform is mobile as explained in context of the fourth and the fifth embodiments above, but in contrast to the fourth and the fifth embodiments, both the platform and the turbulent air region are mobile in this case.

According to the sixth example embodiment, the method calculates the range based on the relationship:

$$R_t = -R_s \left\{ \frac{V_{tz} + \frac{H_0}{\Delta t} + V_{az}}{V_{sz} - \frac{H_0}{\Delta t} - V_{az}} \right\} \quad (12)$$

where $R_t$ is the range from the mobile turbulent air region to the mobile platform, $R_s$, $H_0$, $\Delta t$, $V_{az}$, and $V_{sz}$ are as explained above, and $V_{tz}$ is vertical velocity of the turbulent air region.

In a seventh example embodiment, the airplane-to-satellite line of sight is several degrees from horizontal. Also in the seventh example embodiment, the first antenna and the second antenna are separated vertically, and both the platform and the turbulent air region are mobile as explained in context of the sixth embodiment above. However, in contrast to the sixth example embodiment, parameters are affected by a correction due to platform-to-satellite line of sight.

Thus, according to the seventh example embodiment, the method calculates the range based on the relationship:

$$R_t = -R_s \left\{ \frac{V_{t\_el} + \frac{H_{0\_el}}{\Delta t} + V_{a\_el}}{V_{s\_el} - \frac{H_{0\_el}}{\Delta t} - V_{a\_el}} \right\} \quad (13)$$

where $R_t$ is the range from the mobile turbulent air region to the mobile platform, $R_t$ is corrected for platform-to-satellite line of sight, $R_s$ is the distance between the mobile platform and the satellite, $V_{t\_el}$ is the vertical velocity of the mobile turbulent air region projected onto an elevation unit vector, $H_{0\_el}$ is the vertical separation between the first antenna and the second antenna projected onto the elevation unit vector, $\Delta t$ is the correlation lag as explained above, $V_{a\_el}$ is the vertical velocity of the mobile platform projected onto the elevation unit vector, $V_{s\_el}$ is the vertical velocity of the satellite projected onto the elevation unit vector, and e is the elevation unit vector, E, of the airplane-to-satellite vector, $R_s$. E is in the direction of increasing elevation angle. E is vertical when $R_S$ is horizontal, but is tipped away from vertical when $R_s$ is not horizontal, i.e., when the satellite is not exactly on the horizon as seen by the platform. E is defined as:

$$E = \frac{[(Rs \times k) \times Rs]}{|(Rs \times k) \times Rs|} \quad (13a)$$

where E, Rs, and k are vector quantities, k is the unit vector in the z direction (vertical), "×" indicates a cross product, and vertical bars indicate vector magnitude. To compute the projection of any vector A onto E, a dot product is used:

$$A_{el} = A \cdot E \quad (13b)$$

For example, the value of $V_{t\_el}$ can be computed in equation (13b) as:

$$V_{t-el} = V_t \cdot E \quad (13c)$$

Note that in cases where the platform-to-satellite vector is substantially non-horizontal, $V_{t\_el}$ cannot be assumed to be zero.

After the calculations of the range from the turbulent air region, according to the above embodiments, process 300 then issues a warning indicating the range (task 308) and stops.

As described above, the turbulent airmass shifts the phase of the satellite signal, and because the airmass has "lumpy" refractivity, the phase shift varies depending on the path of the signal. This turns the orderly, uniform satellite signal into an interference pattern. In general, the interference pattern is a pattern of peaks and troughs that results when two or more signals traveling slightly different paths from the same source are brought together. The interference pattern varies with time and position. The leading antenna detects the interference pattern first, followed by the trailing antenna, and establishes the time difference between detecting the interference at the leading and trailing antennae to calculate the range $R_t$ to the turbulent air region as explained in detail below.

Figure 4:
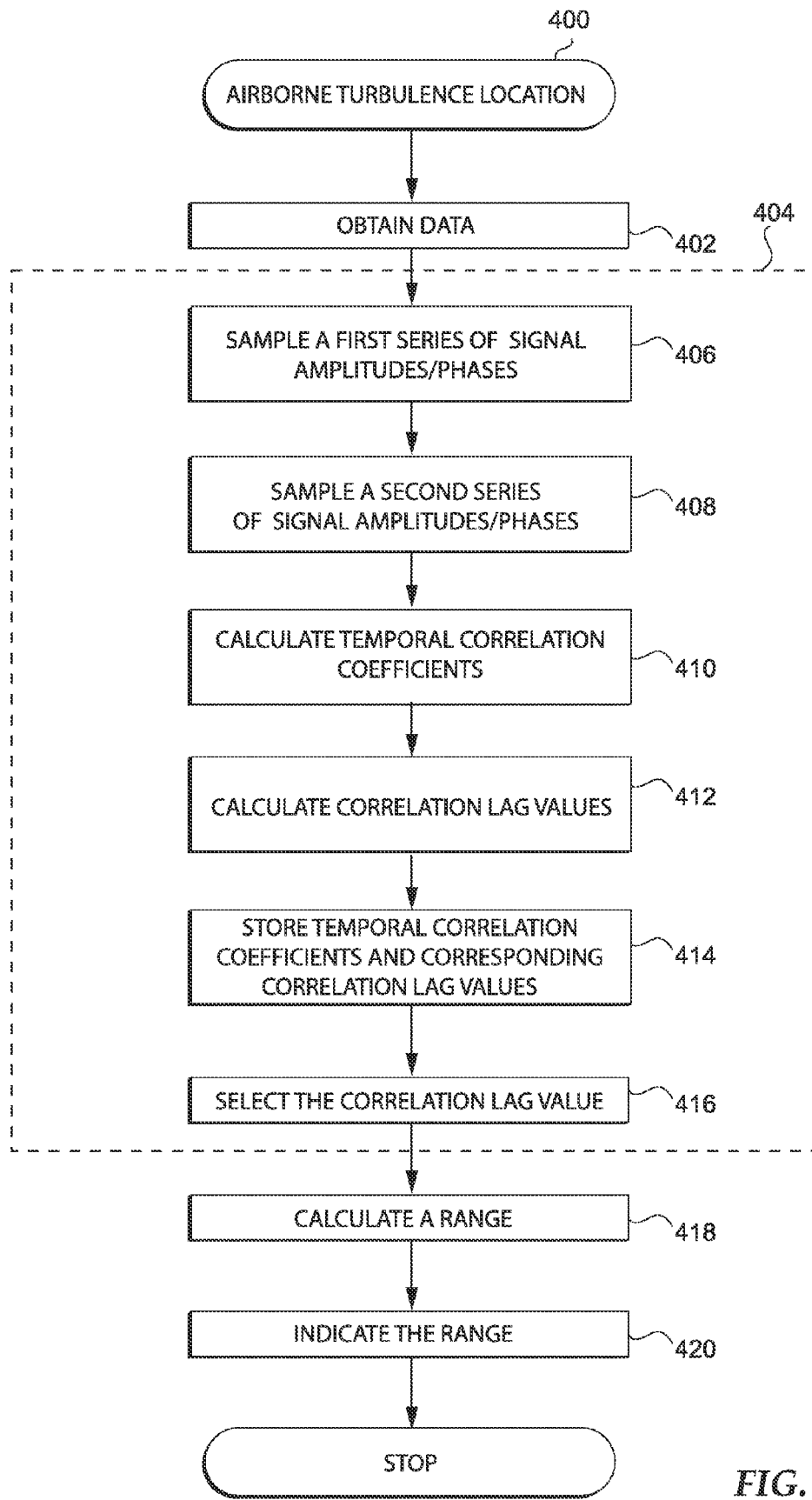
FIG. 4 is a flow chart that illustrates another process for locating airborne turbulence.

FIG. 4 is a flow chart that illustrates an airborne turbulence location process 400 according to an example embodiment of the invention. The various tasks performed in connection with process 400 may be performed by software, hardware, firmware, or any combination thereof. For illustrative purposes, the following description of process 400 may refer to elements mentioned above in connection with FIG. 1, FIG. 2 and FIG. 3. In practical embodiments, portions of process 400 may be performed by different elements of the system 200, e.g., the first antenna 214, the second antenna 216, the receiver 220, the processing logic element 222, the correlator module 224, the memory module 226 and the communication network architecture 230.

Process 400 may begin by obtaining the measurement data for calculating the range based upon a correlation lag value (task 402) as explained in the context of FIG. 3 above. This example embodiment uses temporal correlation techniques to measure the time difference between the leading (forward) and trailing (aft) antennae. Correlation of signals from leading and trailing antennae yields a correlation peak at a value of $\Delta t$ corresponding to a time shift, caused by the turbulent air region, in receiving the interference pattern at the leading and trailing antennas (satellite image speed is corrected for aircraft motion, wind, etc.). This example embodiment of the invention computes the correlation coefficient r($\Delta t$) for many values of $\Delta t$ and selects the one with the highest value (peak correlation value) as marking the range to the greatest turbulence. This embodiment computes the correlation coefficient using signal amplitude measurements at the leading and trailing antennas. Alternative embodiments may use signal phase measurements, or a combination of signal phase and signal amplitude, to compute the correlation coefficient.

When the interference pattern speed $V_i$ is almost exactly the same as the platform speed, $\Delta t$ for the interference pattern to move from one antenna to the other can be several seconds. Maximum correlation coefficient r($\Delta t$) may decrease with longer $\Delta t$ because the turbulence pattern changes over time. Temporal coherence describes the correlation or predictable relationship between signals observed at different moments in time. A preferred embodiment uses the temporal coherence interval of turbulence to deflate r($\Delta t$) values at short $\Delta t$ and inflate r($\Delta t$) values at long $\Delta t$ to give an unbiased comparison of turbulence strength at all ranges.

Figure 5:
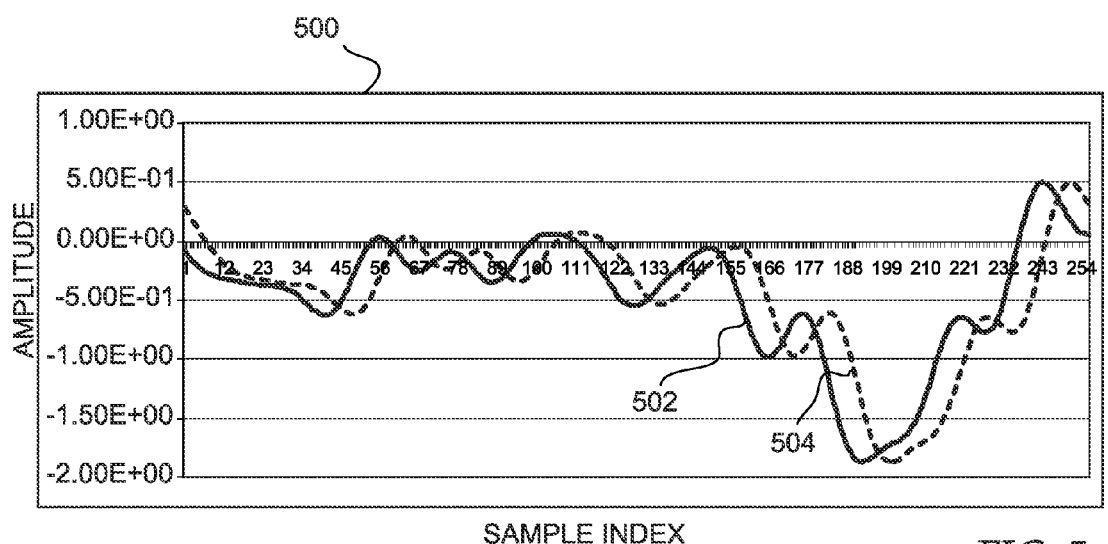
FIG. 5 illustrates an example of amplitude patterns sampled at each antenna.
Figure 6:
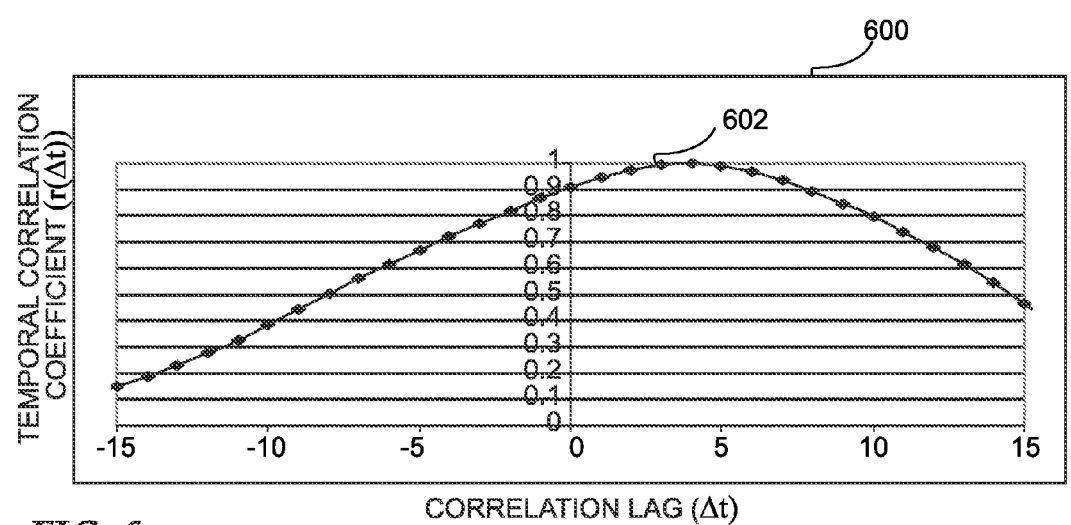
FIG. 6 illustrates an example of temporal correlation coefficients versus correlation lag values.

Thus, process 400 proceeds to compute a correlation lag (reference number 404) by sampling a first series of signal amplitudes/phases, corresponding to the interference pattern at the aft antenna (task 406), and sampling a second series of signal amplitudes/phases, corresponding to the interference pattern at the forward antenna (task 408). In this embodiment, the first and second series of signal amplitudes/phases are sampled at the same sampling interval. FIG. 5 illustrates an example of amplitude patterns sampled at each antenna. The first series of signal amplitudes 502 of the interference pattern 108 is sampled at the forward antenna 118 and the second series of signal amplitudes 504 of the interference pattern 108 is sampled at the aft antenna 116. In this example, 256 samples are used at each antenna.

The satellite in this example is in a low earth orbit. The platform in this example is an airplane. The satellite's direction of travel is about 125° away from the airplane's heading, i.e. the satellite appears to move backward relative to the airplane. The satellite's speed $V_s$ is about 7000 meters per second, but is only about 4000 m/s in the direction perpendicular to the line of sight from the airplane to the satellite. The distance from the airplane to the satellite $R_s$ is about 4200 km. The airplane's true airspeed $V_a$ is about 200 m/s. The forward and aft antennas are about 20 meters apart.

Process 400 then calculates temporal correlation coefficients r($\Delta t$)s between the first series of signal amplitudes 502 and the second series of signal amplitudes 504 (task 410) and continues to calculate correlation lag values Δts corresponding to the temporal correlation coefficients (task 412). The correlation lag value is the time interval between the signal changes at the forward antenna and the signal changes Δt later at the aft antenna (as explained in the context of FIG. 1 above) and its value is calculated, for example, by measuring the time at which the signal amplitude is arrived (detected) at the forward antenna and subtracting it from the time at which the signal amplitude is arrived at the aft antenna. Temporal coherence describes the correlation or predictable relationship between signals observed at different moments in time. Thus, statistical agreements of the measured signal amplitudes at the respective antennas determine the temporal correlation coefficient (how well the amplitudes match) at the calculated value of Δt. Alternative embodiments may use signal phase measurements, or a combination of signal phase and signal amplitude, to compute the temporal correlation coefficient.

Process 400 stores the calculated temporal correlation coefficients and the corresponding correlation lag values (task 414), and selects the correlation lag value corresponding to a highest value of the calculated temporal correlation coefficients (task 416). For example, in FIG. 6, the highest value of the temporal correlation coefficients occurs at about 4 samples 602 (at the peak of the correlation coefficients). This means that if a signal reaching the forward antenna at time $t_i$ pierces the turbulent air region at a particular location, then the same location is pierced by a signal reaching the aft antenna at a time $t_{i+4}$. Given the sample interval of about 0.05 second, this is a correlation lag value of about 0.2 seconds. With about 20 meters between the antennas ($L_0$), that corresponds to a relative image speed $V_i$ of about 100 m/s toward the rear of the airplane. The airplane is moving at about 200 m/s, ($V_a$) so the true image speed $V_i$ is about 100 m/s forward. With a satellite moving about 4000 m/s ($V_s$) backward at a range $R_s$ of about 4200 km, the image speed $V_i$ of about 100 m/s indicates the turbulent air region was pierced at a location about 105 km from the airplane.

Figure 7:
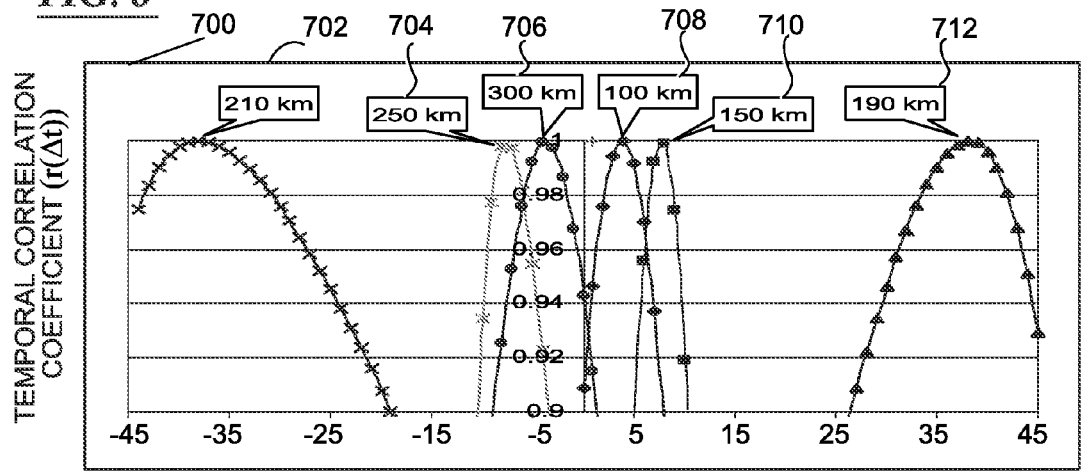
FIG. 7 illustrates correlation peaks for various ranges to the turbulence.

FIG. 7 illustrates correlation peaks for various ranges in kilometers (identified by reference numbers 702-712) to the turbulent air region. As shown in FIG. 7, the peak correlation value may occur at both positive and negative values of Δt. Negative values of Δt occur when the interference pattern speed $V_i$ is positive and faster than the platform, i.e., the interference pattern (the series of amplitudes affected by the turbulent air region) affects the trailing (aft) antenna before the leading (forward) antenna. This can occur with iGPS wherein satellites in low, fast-moving orbits generate GPS signals.

Notably, as shown in FIG. 7, the correlation peak moves to increasingly positive time intervals Δt (from forward to aft antennas) as the range increases (identified by reference numbers 708-712). However, with a retrograde satellite, there is a singularity at a particular range. As range approaches the singularity, about 200 km in this case (not shown in FIG. 7), the correlation peak advances rapidly, then wraps around to negative Δts. It then approaches the origin (Δt=0) from the left (identified by reference numbers 702-706), getting asymptotically closer to the origin as range increases.

Process 400 then continues to calculate the range (task 418) and issues a warning indicating the range (task 420) as explained in the context of the FIG. 3 above.

The example embodiments of the invention described above determines the range to the center of the turbulent air region. However, according to another example embodiment of the invention, the thickness of the turbulent air region may be determined by examining width of the correlation peak. A thin region has a high, narrow correlation peak (narrow in Δt) because all the turbules are at the same range and therefore cast images that move at the same speed. A thick region has a wider peak because some turbules are farther away than others, so the image has many components that move at slightly different speeds. For a given amount of satellite signal scintillation, the intensity is inversely proportional to the measured thickness of the turbulent air region. In this regard, process 400 indicates a thick turbulent air region, with correspondingly low turbulence intensity, if the peak of the temporal correlation curve is relatively wide (wide in Δt) and indicates a thin turbulence air region, with correspondingly high turbulence intensity, if the peak of the temporal correlation curve is relatively narrow.

Embodiments of the invention described herein can increase air traffic system capacity by more precisely pinpointing the location (range and altitude) of the turbulent air region (including CAT), providing a means for the air traffic system providers and the operators to more precisely plan for avoiding a turbulent air region to increase safety and comfort of passengers during transportation or travel.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for calculating a range from a turbulent air region to a platform to determine the location of the turbulent air region with respect to said platform, the method comprising:

propagating an electromagnetic signal from a satellite through the turbulent air region;

determining a correlation lag value in propagation of an interference pattern comprising said electromagnetic signal to a first antenna and to a second antenna on said platform, wherein the correlation lag value corresponds to a time shift in receiving propagation of said interference pattern with respect to said first and second antennas, said time shift caused by the turbulent air region, and wherein the turbulent air region is in a path of said electromagnetic signal sent from said satellite to the platform; and calculating the range based upon the correlation lag value.

2. A method according to claim 1, wherein determining the correlation lag value further comprises:

sampling a first series of signal amplitudes, corresponding to the interference pattern, at the first antenna at a sampling interval;

sampling a second series of signal amplitudes, corresponding to the interference pattern, at the second antenna at the sampling interval;

calculating temporal correlation coefficients between the first and the second series of signal amplitudes;

calculating correlation lag values corresponding to the temporal correlation coefficients; and selecting the correlation lag value corresponding to a highest value of the temporal correlation coefficients.

3. A method according to claim 1, further comprising issuing a warning indicating the range.

4. A method according to claim 1, wherein:
the turbulent air region is a stationary turbulent air region;
the platform is a stationary platform; and
calculating the range is based on the relationship $$R_t = -R_s \left[ \frac{L_0}{V_s \Delta t - L_0} \right],$$

where $R_t$ is the range from the stationary turbulent air region to the platform, $R_s$ is the distance between the stationary platform and the satellite, $L_0$ is horizontal separation between the first antenna and the second antenna, $V_s$ is horizontal velocity of the satellite, and $\Delta t$ is the correlation lag.

5. A method according to claim 1, wherein:
the turbulent air region is a stationary turbulent air region;
the platform is a mobile platform; and
calculating the range is based on the relationship $$R_t = -R_s \left\{ \frac{\frac{L_0}{\Delta t} + V_a}{V_s - \left(\frac{L_0}{\Delta t} + V_a\right)} \right\},$$

where $R_t$ is the range from the stationary turbulent air region to the mobile platform, $R_s$ is the distance between the mobile platform and the satellite, $L_0$ is horizontal separation between the first antenna and the second antenna, $\Delta t$ is the correlation lag, $V_a$ is horizontal velocity of the mobile platform, and $V_s$ is horizontal velocity of the satellite.

6. A method according to claim 1, wherein:
the turbulent air region is a mobile turbulent air region;
the platform is a mobile platform; and
calculating the range is based on the relationship $$R_t = -R_s \left\{ \frac{V_t + \frac{L_0}{\Delta t} + V_a}{V_s - \frac{L_0}{\Delta t} - V_a} \right\},$$

where $R_t$ is the range from the mobile turbulent air region to the mobile platform, $R_s$ is distance between the mobile platform to the satellite, $V_t$ is horizontal velocity of the turbulence, $L_0$ is horizontal separation between the first antenna and the second antenna, at is the correlation lag, $V_s$ is horizontal velocity of the satellite, and $V_a$ is horizontal velocity of the mobile platform.

7. A method according to claim 1, wherein:
the turbulent air region is a stationary turbulent air region;
the platform is a stationary platform; and
calculating the range is based on the relationship $$R_t = -R_s \frac{H_0}{V_{sz} \Delta t - H_0},$$

where $R_t$ is the range from the stationary turbulent air region to the stationary platform, $R_s$ is the distance between the stationary platform and the satellite, $H_0$ is vertical separation between the first antenna and the second antenna, $V_{sz}$ is vertical velocity of the satellite, and $\Delta t$ is the correlation lag.

8. A method according to claim 1, wherein:
the turbulent air region is a stationary turbulent air region;
the platform is a mobile platform; and
calculating the range is based on the relationship $$R_t = -R_s \left\{ \frac{\frac{H_0}{\Delta t} + V_{az}}{V_{sz} - \left(\frac{H_0}{\Delta t} - V_{az}\right)} \right\},$$

where $R_t$ is the range from the stationary turbulent air region to the mobile platform, $R_s$ is the distance between the mobile platform and the satellite, $H_0$ is vertical separation between the first antenna and the second antenna, $\Delta t$ is the correlation lag, $V_{az}$ is vertical velocity of the mobile platform, and $V_{sz}$ is vertical velocity of the satellite.

9. A method according to claim 1, wherein:
the turbulent air region is a mobile turbulent air region;
the platform is a mobile platform; and
calculating the range is based on the relationship $$R_t = -R_s \left\{ \frac{V_{tz} + \frac{H_0}{\Delta t} + V_{az}}{V_{sz} - \frac{H_0}{\Delta t} - V_{az}} \right\},$$

where $R_t$ is the range from the mobile turbulent air region to the mobile platform, $R_s$ is the distance between the mobile platform and the satellite, $V_{tz}$ is vertical velocity of the mobile turbulent air region, $H_0$ is vertical separation between the first antenna and the second antenna, $\Delta t$ is the correlation lag, $V_{tz}$ is vertical velocity of the mobile turbulent air region, $V_{az}$ is vertical velocity of the mobile platform, and $V_{sz}$ is vertical velocity of the satellite.

10. A method according to claim 1, wherein:
the turbulent air region is a mobile turbulent air region;
the platform is a mobile platform; and
the calculating step is based on the relationship $$R_t = -R_s \left\{ \frac{V_{t\_el} + \frac{H_{0\_el}}{\Delta t} + V_{a\_el}}{V_{s\_el} - \frac{H_{0\_el}}{\Delta t} - V_{a\_el}} \right\},$$

where $R_t$ is the range from the mobile turbulent air region to the platform, $R_t$ being corrected for platform-to-satellite line of sight, $R_s$ is the distance between the mobile platform and the satellite, $V_{t\_el}$ is vertical velocity of the mobile turbulent air region projected onto an elevation unit vector, $H_{0\_el}$ is vertical separation between the first antenna and the second antenna projected onto the elevation unit vector, $\Delta t$ is the correlation lag, $V_{a\_el}$ is vertical velocity of the mobile platform projected onto the elevation unit vector, and $V_{s\_el}$ is vertical velocity of the satellite projected onto the elevation unit vector.

11. A method according to claim 1, further comprising obtaining data for calculating the range based upon the correlation lag value, the data including:
a horizontal velocity of the platform;
a horizontal velocity of a satellite;
a horizontal velocity of the turbulent air region;
a horizontal separation between the first antenna and the second antenna;
a distance of the platform from the satellite;
a vertical velocity of the platform;
a vertical velocity of the satellite;

a vertical velocity of the turbulent air region; and a vertical separation between the first antenna and the second antenna.

12. A method for calculating a range from a turbulent air region to a platform to determine the location of said turbulent air region with respect to said platform, the method comprising:

propagating an electromagnetic signal from a satellite through said turbulent air region;

sampling a first series of said electromagnetic signal amplitudes, corresponding to an interference pattern, at a first antenna and at a sampling interval;

sampling a second series of said electromagnetic signal amplitudes corresponding to the interference pattern, at a second antenna and at the sampling interval;

calculating temporal correlation coefficients between the first series and the second series of signal amplitudes;

calculating correlation lag values corresponding to the calculated temporal correlation coefficients;

selecting the correlation lag value corresponding to the highest value of the calculated temporal correlation coefficients, wherein the correlation lag value corresponds to a time shift, caused by the turbulent air region, in receiving the interference pattern at the first antenna and the second antenna; and calculating the range based upon the correlation lag value.

13. A method according to claim 12, further comprising storing:

the first series of signal amplitudes and the second series of signal amplitudes;

the calculated temporal correlation coefficients;

the correlation lag values; and the sampling interval.

14. A method according to claim 12, wherein the highest value of the calculated temporal correlation coefficients is at a peak of a temporal correlation curve.

15. A method according to claim 14, further comprising determining thickness of the turbulent air region based upon the peak of the temporal correlation curve.

16. A method according to claim 15, further comprising:

indicating a thick turbulent air region if the peak of the temporal correlation curve is relatively wide; and indicating a thin turbulent air region if the peak of the temporal correlation curve is relatively narrow.

17. A system for calculating a range from a turbulent air region to a platform to determine the location of said turbulent air region with respect to said platform, the system comprising:

a plurality of antennas, each responsive to incident electromagnetic energy propagated through the turbulent air region to produce a received interference pattern, wherein the electromagnetic energy travels along a path that is subject to the turbulent air region;

a receiver coupled to the antennas and configured to measure properties of the received interference pattern; and a processing logic element coupled to the receiver and configured to:

determine a correlation lag value, wherein the correlation lag value corresponds to a time shift in, receiving propagation, caused by the turbulent air region, of said interference pattern with respect to a first antenna and a second antenna on the platform;

calculate the range based upon the correlation lag value.

18. A system according to claim 17, wherein the processing logic element is further configured to:

sample a first series of signal amplitudes, corresponding to the received interference pattern, at the first antenna and at a sampling interval; and sample a second series of signal amplitudes, corresponding to the received interference pattern, at the second antenna and at the sampling interval.

19. A system according to claim 18, further comprising a correlator module coupled to the processing logic element and configured to:

calculate temporal correlation coefficients between the first and the second series of signal amplitudes;

calculate correlation lag values corresponding to the calculated temporal correlation coefficients; and select the correlation lag value corresponding to a highest value of the calculated temporal correlation coefficient.

20. A system according to claim 19, further comprising a memory module coupled to the processing logic element and configured to store:

the first and the second series of signal amplitudes;

the calculated temporal correlation coefficients;

the correlation lag values; and the sampling interval.

21. A system according to claim 17, wherein the antennas are separated vertically along the height of the platform.

22. A system according to claim 17, wherein the antennas are separated horizontally along the length of the platform.

23. A system according to claim 17, wherein the receiver comprises a satellite receiver.

24. A system according to claim 17, further comprising a communication network coupled to the processing logic element and configured to issue a warning that indicates the range.

25. A system according to claim 17, wherein the processing logic element is further configured to:

sample a first series of signal phases, corresponding to the received interference pattern, at the first antenna and at a sampling interval; and sample a second series of signal phases, corresponding to the received interference pattern, at the second antenna and at the sampling interval.

26. A system according to claim 19, wherein the correlator module is further configured to:

calculate temporal correlation coefficients between a first and a second series of signal phases;

calculate correlation lag values corresponding to the calculated temporal correlation coefficients; and select the correlation lag value corresponding to a highest value of the calculated temporal correlation coefficient.

27. A method for calculating a range from a turbulent air region to a platform to determine the location of said turbulent air region with respect to said platform, the method comprising:

propagating an electromagnetic signal from a satellite through said turbulent air region;

sampling a first series of said electromagnetic signal phases, corresponding to an interference pattern, at a first antenna and at a sampling interval;

sampling a second series of said electromagnetic signal phases, corresponding to the interference pattern, at a second antenna and at the sampling interval;

calculating temporal correlation coefficients between the first series and the second series of signal phases;

calculating correlation lag values corresponding to the calculated temporal correlation coefficients;

selecting the correlation lag value corresponding to the highest value of the calculated temporal correlation coefficients, wherein the correlation lag value corresponds to a time shift, caused by the turbulent air region, in receiving the interference pattern at the first antenna and the second antenna; and calculating the range based upon the correlation lag value.

* * * * *